United States Patent
Wysoczanski et al.

(10) Patent No.: US 11,709,623 B2
(45) Date of Patent: Jul. 25, 2023

(54) NAND-BASED STORAGE DEVICE WITH PARTITIONED NONVOLATILE WRITE BUFFER

(71) Applicant: SK hynix NAND Product Solutions Corp., San Jose, CA (US)

(72) Inventors: Michal Wysoczanski, Koszalin (PL); Kapil Karkra, Chandler, AZ (US); Piotr Wysocki, Gdansk (PL); Anand S. Ramalingam, Portland, OR (US)

(73) Assignee: SK hynix NAND Product Solutions Corp., San Jose, CA (US)

( * ) Notice: Subject to any disclaimer, the term of this patent is extended or adjusted under 35 U.S.C. 154(b) by 0 days.

(21) Appl. No.: 16/054,983

(22) Filed: Aug. 3, 2018

(65) Prior Publication Data
US 2019/0042146 A1 Feb. 7, 2019

(51) Int. Cl.
G06F 3/06 (2006.01)
G06F 12/02 (2006.01)
G06F 13/38 (2006.01)

(52) U.S. Cl.
CPC ............ *G06F 3/0656* (2013.01); *G06F 3/061* (2013.01); *G06F 3/0644* (2013.01); *G06F 3/0679* (2013.01); *G06F 12/0246* (2013.01); *G06F 13/38* (2013.01); *G06F 2212/7201* (2013.01); *G06F 2212/7204* (2013.01); *G06F 2213/0062* (2013.01)

(58) Field of Classification Search
CPC ...... G06F 3/0656; G06F 3/061; G06F 3/0644; G06F 3/0679; G06F 12/0246; G06F 13/38; G06F 2212/7201; G06F 2212/7204; G06F 2213/0062; G06F 12/0846; G06F 2212/1036; G06F 2212/313; G06F 2212/7203; G06F 2212/7208; G06F 3/0659; G06F 12/0868; G06F 12/0871; G06F 3/0616
USPC .......................................................... 711/103
See application file for complete search history.

(56) References Cited

U.S. PATENT DOCUMENTS 5,388,222 A * 2/1995 Chisvin .................... G06F 9/52
 711/154
7,562,189 B2 * 7/2009 Hamilton ................ G06F 16/10
 711/114

(Continued)

FOREIGN PATENT DOCUMENTS

WO 2015065310 A1 5/2015

OTHER PUBLICATIONS

Haining, "Non-Volatile Cache Management for Improving Write Response Time With Rotating Magnetic Media," Sep. 2000, University of California, Santa Cruz (Year: 2000).*

*Primary Examiner* — Michael Krofcheck
(74) *Attorney, Agent, or Firm* — Byrne Poh LLP

(57) ABSTRACT

A storage system includes a NAND storage media and a nonvolatile storage media as a write buffer for the NAND storage media. The write buffer is partitioned, where the partitions are to buffer write data based on a classification of a received write request. Write requests are placed in the write buffer partition with other write requests of the same classification. The partitions have a size at least equal to the size of an erase unit of the NAND storage media. The write buffer flushes a partition once it has an amount of write data equal to the size of the erase unit.

20 Claims, 9 Drawing Sheets

(56) References Cited

U.S. PATENT DOCUMENTS

| | | | |
|---|---|---|---|
| 8,244,960 B2* | 8/2012 | Paley | G06F 12/0246 |
| | | | 711/103 |
| 9,232,651 B2 | 1/2016 | Ware et al. | |
| 9,317,427 B2 | 4/2016 | DeSota et al. | |
| 2004/0081005 A1 | 4/2004 | Garrett et al. | |
| 2005/0108458 A1 | 5/2005 | Vogt | |
| 2005/0108490 A1 | 5/2005 | Vogt | |
| 2006/0004953 A1 | 1/2006 | Vogt | |
| 2006/0146637 A1 | 7/2006 | Vogt | |
| 2006/0288132 A1 | 12/2006 | McCall et al. | |
| 2007/0005900 A1* | 1/2007 | Horrigan | G06F 12/0804 |
| | | | 711/E12.04 |
| 2008/0005496 A1 | 1/2008 | Dreps et al. | |
| 2008/0189455 A1 | 8/2008 | Dreps et al. | |
| 2008/0307164 A1* | 12/2008 | Sinclair | G06F 12/0246 |
| | | | 711/135 |
| 2009/0216924 A1 | 8/2009 | Bennett | |
| 2009/0319719 A1 | 12/2009 | Perego et al. | |
| 2011/0138133 A1 | 6/2011 | Shaeffer | |
| 2011/0145473 A1* | 6/2011 | Maheshwari | G06F 3/0619 |
| | | | 711/E12.008 |
| 2012/0191921 A1 | 7/2012 | Shaeffer et al. | |
| 2012/0221769 A1 | 8/2012 | Ware et al. | |
| 2013/0246890 A1 | 9/2013 | Au et al. | |
| 2014/0201429 A1 | 7/2014 | Tal | |
| 2015/0039836 A1* | 2/2015 | Wang | G06F 12/0804 |
| | | | 711/136 |
| 2016/0124655 A1 | 5/2016 | Benhase et al. | |
| 2016/0283125 A1 | 9/2016 | Hashimoto et al. | |
| 2017/0285941 A1 | 10/2017 | Nale et al. | |
| 2017/0285992 A1 | 10/2017 | Vogt | |
| 2017/0289850 A1 | 10/2017 | Nale et al. | |
| 2017/0315730 A1 | 11/2017 | Hashimoto et al. | |
| 2018/0019008 A1 | 1/2018 | Norman | |
| 2018/0173461 A1* | 6/2018 | Carroll | G06F 3/0656 |
| 2018/0181491 A1 | 6/2018 | DeLaurier et al. | |
| 2018/0189207 A1 | 7/2018 | Nale et al. | |
| 2018/0357016 A1 | 12/2018 | Hashimoto et al. | |
| 2019/0004724 A1 | 1/2019 | Kanno | |
| 2019/0018809 A1 | 1/2019 | Nale et al. | |
| 2019/0243759 A1* | 8/2019 | Stonelake | G06F 1/30 |

* cited by examiner

US 11,709,623 B2

NAND-BASED STORAGE DEVICE WITH PARTITIONED NONVOLATILE WRITE BUFFER

FIELD

Descriptions are generally related to nonvolatile storage, and more particular descriptions are related to a nonvolatile storage write buffer partitioned in accordance with classification of write data.

BACKGROUND

NAND-based storage has an erase unit that refers to a portion of storage that is erased or written as a single unit. The erase unit is larger than the block size that represents the smallest unit of addressable storage. Thus, an erase unit includes multiple data blocks. As the storage device is used, certain blocks of data may get overwritten while others are unchanged. In a NAND device, data changes are written to a new segment of data, and the old segment is reclaimed. However, NAND cells have a limited number of write cycles they can tolerate before they become unreliable, which suggests that the system should minimize the number of writes to preserve the life of the storage device.

Typically data is scattered throughout a NAND storage device, where data that may be written frequently can occupy a segment of the device with data that may rarely or never be modified. The NAND devices traditionally write data as soon as a change occurs, no matter how much of the erase unit would be affected. NAND storage devices typically have very good average performance with fairly consistent average read and write latency. However, NAND storage devices can suffer from read tail latency issues, where average access time is clustered around a median time, but there is a significant standard deviation for latency increase, making for tail cases that have significantly longer latency than the median. There are several factors that have negative impact on tail latency: increased write amplification factor (WAF), background operations performed by NAND drives, sensitivity to write bursts, and other factors. WAF refers to the condition where a relatively small number of active blocks results in high churn of the storage segments. High WAF causes shorter device lifetime, and higher power consumption due to additional program and erase operation generated by drive background operations.

Many applications are not significantly impacted by high tail latency, and so the negative effects are tolerated, even though undesirable. For applications that need low and stable read tail latency, there is traditionally a requirement for either specific logic in the application that utilizes knowledge of the storage media characteristics to make workloads that are "friendly" to the media, or a requirement for a middleware layer that transforms application workloads to media-friendly workloads. A media-friendly workload refers to a workload that applies knowledge of the segment size and background processes of the storage media to deliver write requests that align with the characteristics of the storage device. However, such applications may be limited to the specific NAND drive. Additionally, implementing additional logic in the application or in middleware increases cost.

One approach to addressing WAF is to organize the data as "streams." Applications that use streams-capable drives can open streams to group data into flows of similar frequency of modification. However, implementing streams requires support through the entire I/O (input/output) stack, from the hardware level to the application level. There has not been much adoption of streams technology in hardware, which limits its use. Furthermore, streams technology requires additional drive capacity for each open stream, which reduces spare space available. In some cases the separation of the drive into different streams can actually increase write amplification factor.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

As described herein, a storage system includes a NAND storage media and a nonvolatile storage media as a write buffer for the NAND storage media. The write buffer is partitioned, where the partitions are to buffer write data based on a classification of a received write request. Write requests are placed in the write buffer partition with other write requests of the same classification. The partitions have a size at least equal to the size of an erase unit of the NAND storage media. The write buffer flushes a partition to the NAND when it has an amount of write data equal to the size of the erase unit. The write buffer has a faster access time than the NAND storage media. For example, the write buffer can have a faster NAND media than the primary NAND storage. As another example, the write buffer can include a non-NAND nonvolatile storage media.

A partitioned write buffer as described herein enables the storage system to aggregate data in the write buffer and transfer the write data based on erase units (such as an erase block or an erase band). Partitioning the write buffer allows for aggregation of the data based on classification. Flushing the data based on partition reduces write amplification factor (WAF) and improves the use of the NAND storage media. Storage devices such as solid state drives (SSDs) can include data for multiple different applications or agents. In a cloud-based system, the devices can store data for multiple different tenants. Some systems have I/O (input/output) determinism requirements, where the different agents or the different tenants have an expectation of access time within an expected time. For example, a system may have a storage device may respond 99.9999% within the expected time, with tail events falling outside the expected time. The tail events can impact the overall performance of the storage device. The partitioned buffer can manage tail latency by reducing the internal operations of the storage device and improving the overall access performance of the storage device.

Figure 1:
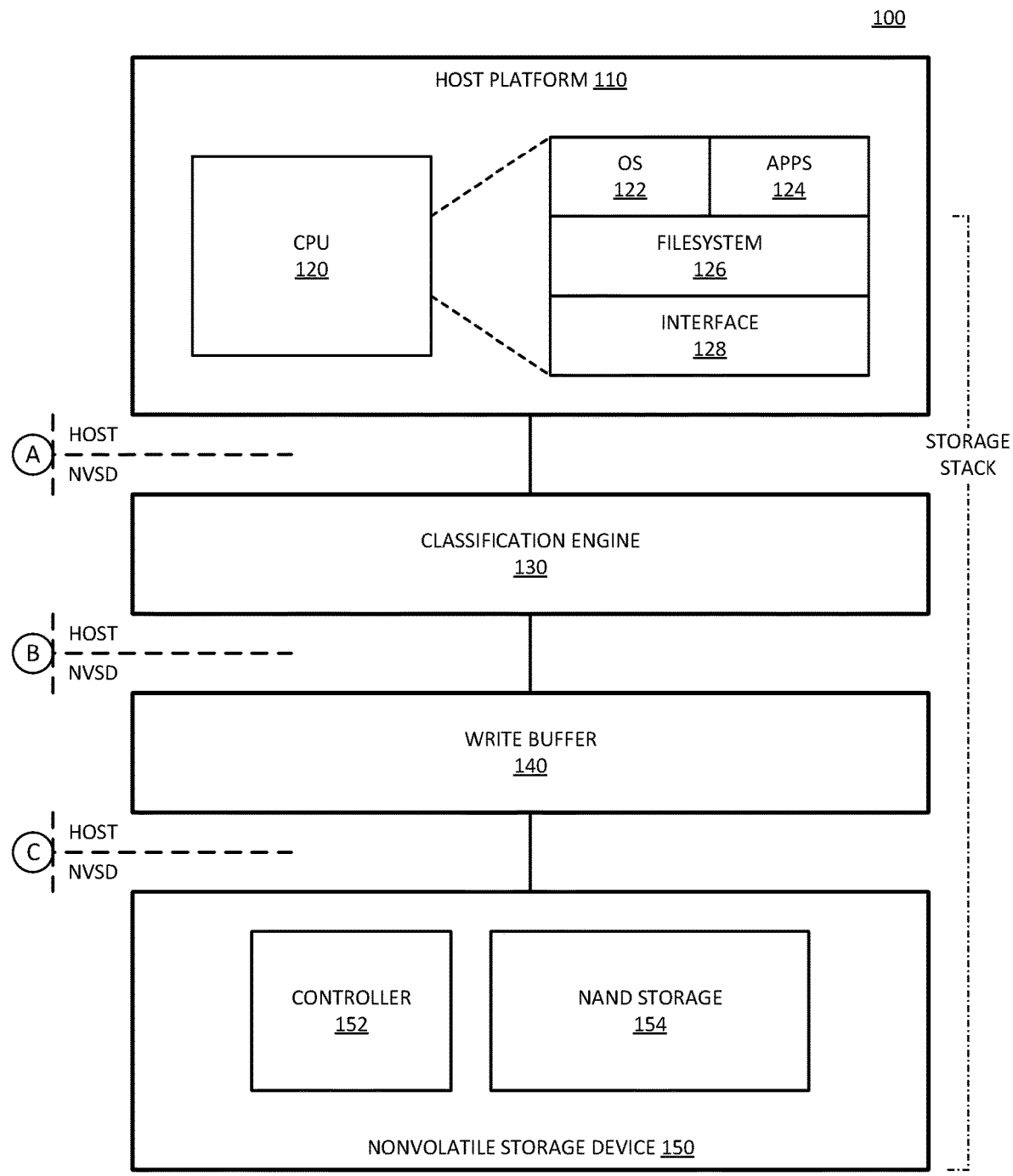
FIG. 1 is a block diagram of an example of a system with a partitioned write buffer for a nonvolatile storage device.

FIG. 1 is a block diagram of an example of a system with a partitioned write buffer for a nonvolatile storage device. System 100 represents a computing system with nonvolatile storage device 150. Host platform 110 represents a hardware platform to control system 100. Classification engine 130 represents logic to perform classification of write requests. Write buffer 140 represents a partitioned write buffer in accordance with any description herein. Nonvolatile storage device 150 represents a NAND-based storage device. Nonvolatile storage device 150 can be any NAND-based storage device or solid state drive (SSD) that has an erase unit.

The dashed line on the right of the diagram represents an example of a storage stack, from the filesystem to nonvolatile storage device 150. The storage stack of system 100 can be separated in different ways. In example A, classification engine 130 and write buffer 140 are part of nonvolatile storage device 150. In example B, classification engine 130 is part of host platform 110 and write buffer 140 is part of nonvolatile storage device 150. In example C, classification engine 130 and write buffer 140 are part of the host or host system 110.

Host platform 110 includes CPU (central processing unit) 120 or other processor. CPU 120 represents control hardware to manage control of system 100. CPU 120 executes a host OS (operating system) 122 and applications (apps) 124. OS 122 provides a software platform and provides the control processes to interface with the hardware of the system. Filesystem 126 represents control logic to enable access to data storage in system 100. In one example, host platform 110 includes volatile memory (not specifically shown) for shorter term storage of data and code. Volatile memory refers to storage that has indeterminate state if power is interrupted to the memory. Nonvolatile memory maintains state even if power is interrupted.

Filesystem 126 typically provides the data structure for volatile and nonvolatile memory. Filesystem 126 determines how data is related to other data, and how the data is organized. In one example, filesystem 126 is part of OS 122. Filesystem 126 can provide logic to physical address mapping. In one example, filesystem 126 can provide block address information for data stored in nonvolatile storage device 150. Filesystem 126 can provide an access path to OS 122 and applications 124 that execute under or as a part of OS 122. In response to operation by OS 122 or an application 125, or both, filesystem 126 can request a read access operation or a write access operation or a combination of a read access operation and a write access operation for data stored in nonvolatile storage device 150.

In one example, CPU 120 executes one or more logic elements to provide interface 128. Interface 128 represents drivers or control logic to interface software operations to hardware control. Interface can enable OS 122 and applications 124 to interact with other hardware elements of the storage stack. Interface 128 can provide service requests to be called by filesystem 126 to access data.

Classification engine 130 provides classification operations for system 100. Classification refers to classifying the data associated with a write access request. In a simple form, the data can be classified as either code or user data. In one example, classification refers to determination of a lifetime of the data. In one example, the lifetime of the data refers to a frequency of update or modification of the data. Thus, data with a short lifetime is expected to be modified more frequently than data with a long lifetime. Classification based on lifetime can be a sorting of data based on how long the data is expected to be valid in nonvolatile storage device 150, with longer lifetimes referring to longer periods of validity of the stored data.

Write buffer 140 represents a storage media that can be used to arrange write requests to be workload friendly for nonvolatile storage device 150. Write buffer 140 represents separate storage from NAND storage 154. In one example, write buffer 140 does not have the same write constraints as nonvolatile storage device 150, and does not require specific operations or requests by the host as nonvolatile storage device 150 would have for extended life of the write media.

In one example, write buffer 140 represents a nonvolatile storage media that is not block-based. In one example, write buffer 140 can be a volatile memory buffer. However, a volatile memory buffer loses state if power is interrupted, which could result in data loss. An example of non-block based nonvolatile storage is a three dimensional crosspoint (3DXP) media. 3DXP is an example of a byte addressable nonvolatile media.

In one example, write buffer 140 represents a nonvolatile storage media that is also NAND based, but has a faster access time than NAND storage 154. For example, write buffer 140 can be or include single level cell (SLC) NAND media, and NAND storage 154 can be multilevel cell (MLC) NAND media. One option for an implementation with MLC and SLC would be to use QLC (quad level cell) media for the storage device and SLC media as the write buffer. It will be understood that the use of SLC NAND can reduce long-term performance in that a NAND media buffer would be restricted to block-based writes. In one example, the erase unit of the NAND media used as write buffer 140 is smaller than the erase unit of NAND storage 154, which enables the use of finer segmentation for writing to the write buffer.

System 100 can reduce WAF by utilizing the storage media of write buffer 140 somewhere in the storage stack to make data workload friendly for NAND storage 154 of nonvolatile storage device 150. In one example, write buffer 140 groups data that has similar velocity and lifetime into separately-controlled buffers. The separately controlled buffers can be thought of as separate "buckets". By grouping data in classifications, such as by similar velocity or similar lifetime or other classification that makes the media friendly to NAND storage, write buffer 140 can reduce WAF. In one example, write buffer 140 enables write-in-place updates. By absorbing in-place updates, write buffer 140 can further reduce the writing requirements to NAND storage media 154. In one example, write buffer 140 performs bandwidth throttling for flushing to NAND storage 154, which has the effect of flattening write bursts. As such, in one example write buffer 140 can improve read QoS (quality of service) by limiting the maximum amount of access bandwidth used to access NAND storage 154 and leaving bandwidth available to service read requests.

In contrast to traditional systems that process writes as they are received and therefore mixes data with different lifetimes in the same blocks, in one example, classification engine 130 enables system 100 to separate data based on the lifetime of the data associated with the write requests. In one example, classification engine 130 is a software engine executed on host platform 110, such as a module of filesystem 126. In one example, classification engine 130 is a driver of interface 128 that receives data from filesystem 126, and separates the data into different classes within write buffer 140. In one example, classification engine is implemented in firmware either in interface hardware. In one example, classification engine 130 is implemented in controller 152 when write buffer 140 is part of nonvolatile storage device 150.

Write buffer 140 includes multiple separate partitions or buckets for data of different classes. Write buffer 140 is an example of a partitioned nonvolatile storage media. Classification engine 130 places data into specific partitions of write buffer 140 based on a class determined for the write data. In one example, OS 122 or applications 124 or both provide metadata for the write data to indicate a classification indication for the data. For example, data can be tagged or have a header that indicates a classification of the data. In one example, based on the classification of the data, classification engine 130 can determine an estimated lifetime for the data, and place the data in corresponding partitions of write buffer 140.

Nonvolatile storage device 150 represents a storage device that is accessed by write and read requests. In one example, nonvolatile storage device 150 is a standalone device, such as a solid state drive (SSD). In one example, nonvolatile storage device 150 represents storage integrated into a system, such as a device integrated onto a common printed circuit board (PCB) or motherboard of system 100. In one example, nonvolatile storage device 150 can be accessed through a serial advanced technology attachments (SATA) interface. A SATA interface can be compliant with Serial ATA Revision 3.2 (released in August 2013 by the Serial ATA International Organization) or an extension or an update.

Nonvolatile storage device 150 includes controller 152, which represents control logic or control hardware of nonvolatile storage device 150. Controller 152 provides control of operations of nonvolatile storage device 150, such as the processing of received write requests and received read requests. The write requests represent examples of write access operations. The read requests represent examples of read access operations. In response to an access request, controller 152 access the addressed locations of NAND storage 154 to service the request. Controller 152 enables the writing of an erase segment of data from a partition of write buffer 140 to NAND storage 154. NAND storage 154 represents NAND-based storage media to store data. Controller 152 controls the writing of data to and the reading of data from NAND storage 154.

System 100 provides a storage stack that can decrease WAF and improve QoS without requiring applications 124 to be aware of media characteristics of nonvolatile storage device 150. In one example, each partition of write buffer 140 is of the same size or length as a single erase block of NAND storage 154. In one example, each partition of write buffer 140 is of the same size or length as an erase band. An erase block refers to an erase segment for NAND storage 154. An erase band refers to an erase block across different sectors of NAND storage 154. In one example, each partition of write buffer 140 is larger than an erase block or an erase band. In general, write buffer 140 has partitions of sufficient size to all the organization of an entire erase segment, whether the segment is of block granularity or band granularity. Having at least the size of the erase segment allows the partition to store an erase segment and then flush to NAND storage 154 based on the erase segment size.

In one example, write buffer 140 accumulates data with similar velocity or data lifetime in different partitions. Write buffer 140 can be considered an intermediate buffer in the storage stack of the storage system. In one example, write buffer 140 intercepts all writes to NAND storage 154. In one example, OS 122 and applications 124 tag or mark data to enable classification engine 130 to classify the data and place it with other similar data in a write buffer partition. In one example, if data is in write buffer 140, the write buffer performs an update in place or write in place within the buffer.

In one example, write buffer 140 includes a controller or control logic to control the operation of the write buffer. In one example, firmware or software executing on write buffer 140 manages the flushing of data to NAND storage 154. In one example, write buffer 140 guarantees only one partition is flushed at a time. In one example, write buffer 140 restricts flushing to a certain rate of data transfer. Assume as one example that nonvolatile storage device 150 represents an SSD, and NAND storage 154 includes 100 dies. The erase unit can be 100 times the erase block size, which can be the size of a partition in write buffer 140. When write buffer 140 is made of nonvolatile storage media, data is preserved even if power is interrupted to the, in contrast to volatile memory buffers that lose data in the event of an interruption to power.

Figure 2:
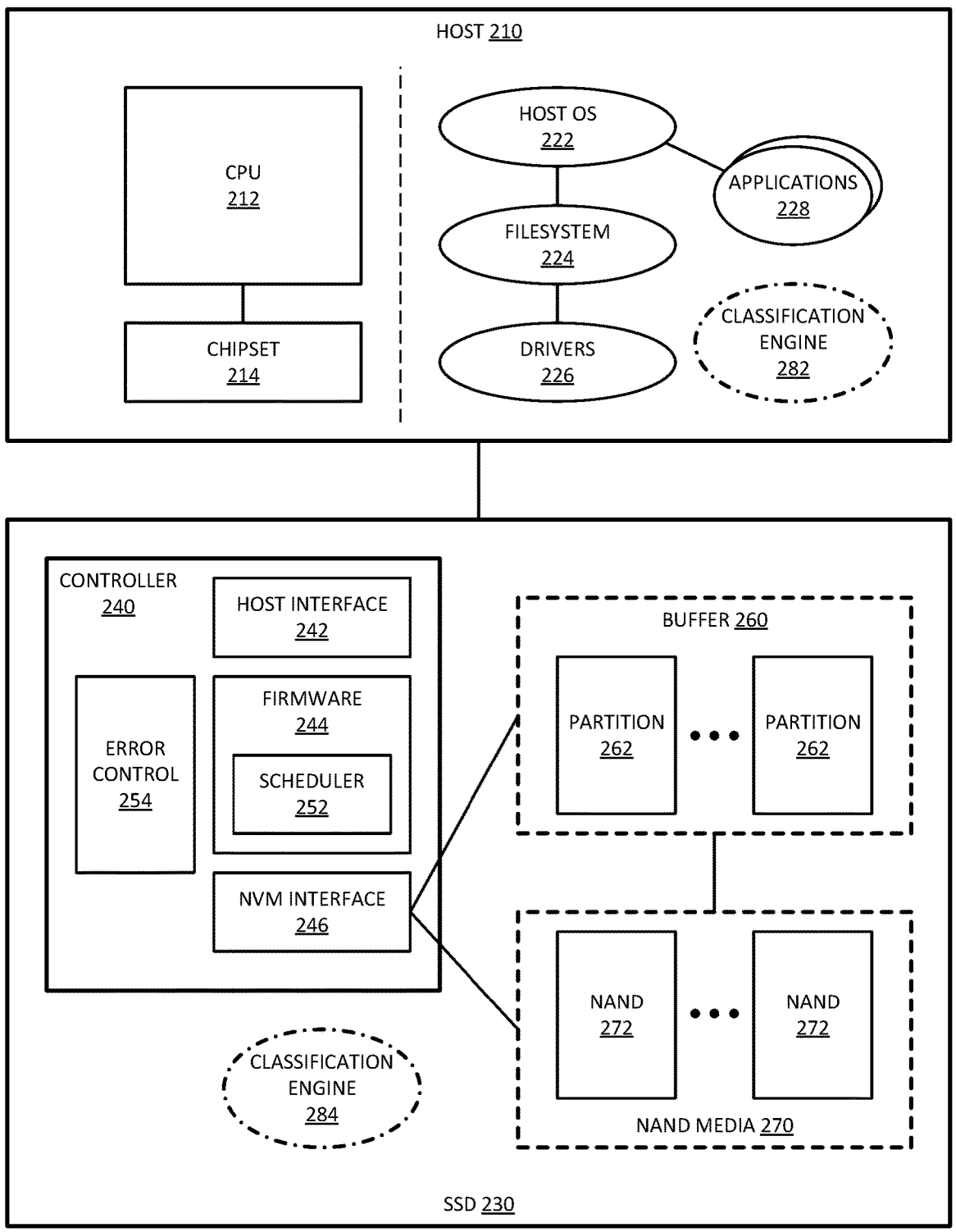
FIG. 2 is a block diagram of an example of a system with a solid state drive (SSD) with a partitioned write buffer.

FIG. 2 is a block diagram of an example of a system with a solid state drive (SSD) with a partitioned write buffer. System 200 includes host 210 coupled to SSD 230. System 200 provides one example of a system in accordance with system 100 of FIG. 1. Host 210 represents a host hardware platform that connects to SSD 230. Host 210 includes CPU (central processing unit) 212 or other processor. CPU 212 represents any host processor that generates requests to access data stored on SSD 230, either to read the data or to write data to the storage, or both. CPU 212 can be or include a single or multi-core device. In one example, a GPU (graphics processing unit) could be used as an alternative or in addition to a CPU. Host 210 includes chipset 214, which represents other hardware components that can be included in connecting between CPU 212 and SSD 230. For example, chipset 214 can include drivers and other logic or circuitry or interconnect hardware to provide access to SSD 230. In one example, chipset 214 includes a storage controller, which is a host-side controller that is separate from controller 240 within SSD 230.

On one side of the dashed line, host 210 illustrates selected components of the hardware platform of host 210. On the other side of the dashed line, host 210 illustrates an example of logical layers of host 210. In one example, host 210 includes host OS 222, which represents the host operating system or software platform for the host. CPU 212 can execute host OS 222 and provide a software platform on which applications, services, agents, or other software executes, generically represented as applications 228. Filesystem 224 represents control logic for controlling access to SSD 230. Filesystem 224 can manage what addresses or memory locations are used to store what data. There are numerous filesystems known, and filesystem 224 can implement known filesystems or other proprietary systems. In one example, filesystem 224 is part of host OS 222. Drivers 226 represent system-level modules that control hardware. In one example, drivers 226 include a software application to control the hardware of SSD 230. The execution of applications 228 can result in access requests for data stored in SSD 230.

SSD 230 represents a solid state drive or other nonvolatile memory storage device that includes NAND media 270 to store data, and buffer 260 to couple NAND media 270 to controller 240. NAND media 270 can include one or more storage chips, represented as NAND 272, including arrays of NAND storage cells. A single NAND chip 272 can include one or more storage arrays that can be the basis of a band for an erase unit. "NAND media" refers to flash storage or other nonvolatile storage that is based on an architecture of NAND (not AND) storage cells. Controller 240 controls access to NAND media 270. In one example, storage controller 240 is an application specific integrated circuit (ASIC). Controller 240 includes host interface 242 to couple to host 210, such as to CPU 212 or through chipset 214. Controller 240 includes NVM (nonvolatile media) interface 246 to interface to NAND media 270. Host interface 242 and NVM interface 246 can represent hardware components to interface with signal lines to interconnect devices, as well as software or firmware components to control the interfaces. In one example, the interfaces can be controlled via state machines or other logic. Such logic can be implemented in hardware, software, or a combination of hardware and software.

Firmware 244 controls the hardware interfaces to enable communication. In one example, firmware 244 includes at least a portion of the logic that could be considered host interface 242 or NVM interface 246, or both. In one example, firmware 244 provides a series of command sequences to NAND media 270, and can control the timing of the command sequences. In one example, SSD 230 includes buffer 260, which represents a partitioned buffer in accordance with any description of a partitioned buffer. In one example, firmware 244 controls the timings of commands to buffer 260 to control the transfer of data to NAND media 270 for a write transaction or from NAND media 270 for a read transaction.

Controller 240 includes scheduler 252 to schedule operations such as the generation and sending of commands or the transfer of data for data access transactions. In one example, scheduler 252 includes one or more queues to buffer sequences of operations. In one example, controller 240 includes error control logic 254 to handle data errors in accessed data, and corner cases in terms of compliance with signaling and communication interfacing.

System 200 includes a classification engine to classify data to determine how to place the data in partitioned buffer 260. Classification engine 282 represents an example of a classification engine in host 210. Classification engine 284 represents an example of a classification engine in SSD 230. In one example, classification engine 284 can be part of firmware 244. In one example, classification engine 284 is an engine that works in conjunction with or as part of scheduler 252. The classification engine can determine which of partitions 262 to place a write data request.

Buffer 260 buffers and re-drives the data signals for a write transaction. Buffer 260 includes multiple partitions 262, which represent separately managed storage spaces within buffer 260. The partitions are managed separately in that each partition will receive write requests separate from the others, and when the partition stores a threshold amount of write data, the partition is flushed separately from other partitions 262. Flushing a partition 262 from buffer 260 refers to transferring the contents of the partition to NAND 272 of NAND media 270.

It will be understood that buffer 260 receives all write data addressed for storage space in NAND media 270. When buffer 260 is part of SSD 230, controller 240 can interface with buffer 260 and provide write data to buffer 260 as well as checking the buffer for read data requests. If buffer 260 is implemented outside SSD 230, controller 240 can receive data from buffer 260 for NAND media 270, when data is to be flushed from buffer 260. When buffer 260 is not part of SSD 230, in one example, the buffer will have a separate controller to execute control logic to manage the partitioned buffer.

Figure 3:
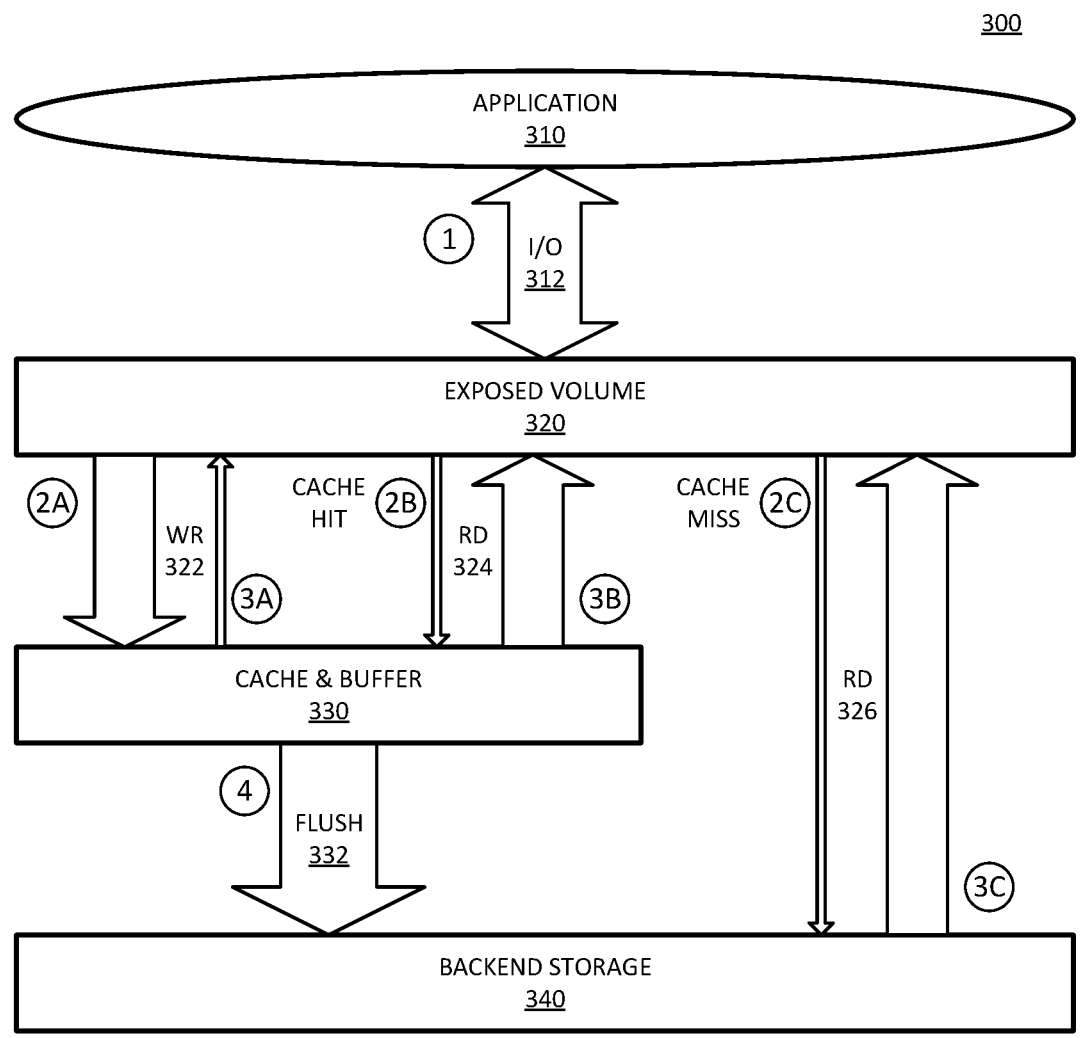
FIG. 3 is a block diagram of an example of an exchange between a host application and a nonvolatile storage device with a partitioned write buffer.

FIG. 3 is a block diagram of an example of an exchange between a host application and a nonvolatile storage device with a partitioned write buffer. System 300 represents a logic flow of a storage system with a partitioned write buffer, and can be in accordance with an example of system 100 of FIG. 1, or system 200 of FIG. 2.

Application 310 represents a software agent executing on a host system that generates a request for data access. Application 310 can be or include a user application or filesystem code that sends I/O (input/output) requests. The I/O requests or the data access request can be a write access request or a read access request, or a combination of a read access request and a write access request. Exposed volume 320 represents a virtual volume to which application 310 sends I/O requests. I/O 312 represents the sending of requests to exposed volume 320. The double-sided arrow represents the fact that read requests can result in data being returned to the application, and write requests can receive an acknowledgement to send back to the application.

Cache & buffer 330 represents a caching device and write buffer for data to be stored in backend storage 340. Cache & buffer 330 can be considered a cache in that data can be read from the cache for a read request that results in a cache hit, prior to flushing the data to backend storage 340. In one example, cache & buffer 330 enables write-in-place for a cache hit for a write request to buffered data that has not been flushed, or a subsequent write request for data that has already been the subject of a write. Cache & buffer 330 is also a buffer for write data to backend storage 340, and the data is buffered prior to being flushed or committed to the backend storage media. In one example, cache & buffer 330 is a 3DXP or 3D crosspoint based media storage. 3DXP is a byte-addressable, nonvolatile storage media. Cache & buffer 330 can handle random writes much more efficiently than NAND media. In one example, cache & buffer 330 can handle overwrites of data, which the NAND media of backend storage 340 is unable to handle. In one example, cache & buffer 330 includes a faster NAND storage media than the NAND media of backend storage 340.

Backend storage 340 represents a NAND-based storage media. In one example, backend storage 340 is a solid state drive (SSD). In one example, cache & buffer 330 is part of the SSD. NAND storage is block-based for read and write, as opposed to the byte-addressability of cache & buffer 330. Cache & buffer 330 provides a storage media that can accumulate and organize write data for storage in the NAND media of backend storage 340. The controller (not specifically shown) that manages cache & buffer 330 will be aware of the architecture of backend storage 340, such as how much storage, the timing and other access properties of the NAND media, the size of an erase unit, how many arrays or chips or other addressable units there are, or other information. With such information, cache & buffer 330 can make the data "friendly" for write to backend storage 340 by reducing or eliminating writes that do not utilize a full erase unit of backend storage 340.

In system 300, application 310 does not directly access the storage media of backend storage 340. Instead application 310 sends I/O requests 312 to exposed volume 320. Exposed volume 320 can provide a virtual device as an exact view of backend storage 340. Depending on the type of request and the state of cache & buffer 330, the caching and buffering logic (referred to subsequently as buffer logic) of system 300 that manages exposed volume 320, such as the processor in charge of cache & buffer 330, can send the I/O request to either cache & buffer 330 or the NAND media of backend storage 340. As described below, the buffer logic can flush data from the write buffer to the NAND media.

The flow of operation of system 300 can be in accordance with the numbers in system 300. At point 1, application 310 sends I/O request 312 to exposed volume 320. When I/O request 312 is a write request to exposed volume 320, the flow follows at point 2A. Write request 322 illustrates the write request being sent to cache & buffer 330. In one example, buffer logic extracts hint from the I/O request, and determines what partition of cache & buffer 330 to use based on the hint information. With write request 322, the buffer logic can generate an acknowledgement as shown at point 3A by the smaller arrow.

In one example, cache & buffer 330 can store multiple write requests for the same data. Alternatively, the buffer logic enables overwriting the data in cache & buffer 330. In one example, the buffer logic determines whether write request 322 accesses an LBA (logical block address) that is already mapped into cache & buffer 330. In one example, if write request 322 accesses an LBA that is mapped to cache & buffer 330, the buffer logic overwrites the data in-place in cache & buffer 330. Writing data in place in cache & buffer 330 can eliminate data overwrites in backend storage 340 by updating data in-place in cache & buffer 330. Eliminating overwrites in backend storage 340 can eliminate the necessity of invalidating blocks on NAND media, which results in erase units having mixed valid and invalid blocks, as traditionally done. System 300 can accumulate data until an erase unit is ready to flush, which can reduce or eliminate erase units with mixed valid and invalid blocks.

In one example, the buffer logic appends the data to an associated partition or selected bucket. In one example, after appending data to a partition in cache & buffer, the buffer logic can determine if the partition reaches a threshold amount of data, or said another way, whether the bucket becomes full for that class of data. In one example, the threshold or full point refers to reaching a size of an optimal erase unit of backend storage 340. In one example, when the threshold is reached the buffer logic marks the partition as ready for flushing.

Cache & buffer 330 is a partitioned buffer, and data is flushed to backend storage 340 based on individual partitions. In one example, when a partition becomes full or reaches a threshold amount of data, the buffer logic marks the partition for flushing. When the threshold is the size or length of an erase unit of the NAND media of backend storage 340, the write to the NAND media can be made without causing WAF. In one example, the buffer logic limits flush 332 to marked partitions. Thus, for example, the buffer logic can include a process to write data to the partition, which would mark a partition as ready to flush. A separate routine within the buffer logic can then identify full partitions or partitions with at least an erase unit amount of data and perform the flush at point 4. In one example, flush 332 includes the entire partition or an entire erase unit from the partition as one flushing iteration. In one example, assuming two or more partitions or buckets have been marked as ready to flush, the buffer logic may limit flushing to a single partition at a time. Thus, in one example the buffer logic flushes one partition marked for flush and completes the flush of that partition prior to flushing another partition marked as ready for flush. As such, system 300 can limit flushing to one partition at a time.

When cache & buffer 330 is partitioned based on lifetime or velocity classification, system 300 allows data with similar velocity or lifetime to be placed at the same erase unit on NAND storage media of backend storage 340. It will be understood such operation can simulate stream functionality, but can be implemented on drives or storage devices that do not support streams. Experimentation has shown that the storage path organization of system 300 significantly reduces WAF.

Returning to the flow at exposed volume 320, when I/O request 312 is a read request, in one example, the buffer logic determines if the read request refers to an LBA stored in cache & buffer 330. As shown at point 2B, in one example, if I/O request 312 results in read request 324 as a cache hit, the buffer logic forwards the read request to cache & buffer 330, which returns the read data at point 3B. As shown at point 2C, in one example, if I/O request 312 results in request 326 as a cache miss, the buffer logic forwards the read request directly to backend storage 340. At point 3C, backend storage 340 returns the read data to application 310.

In one example, when the I/O results in read request 326 with a cache miss, the buffer logic does not insert to the cache, as opposed to the traditional caching solution. Thus, a cache miss does not result in read data being stored in cache & buffer 330 but instead just reads the data from the backend and returns it to application 310. By not inserting the data into cache & buffer 330, system 300 allows utilization of full read bandwidth of the NAND media, while keeping all the bandwidth of cache & buffer 330 for writes.

Figure 4:
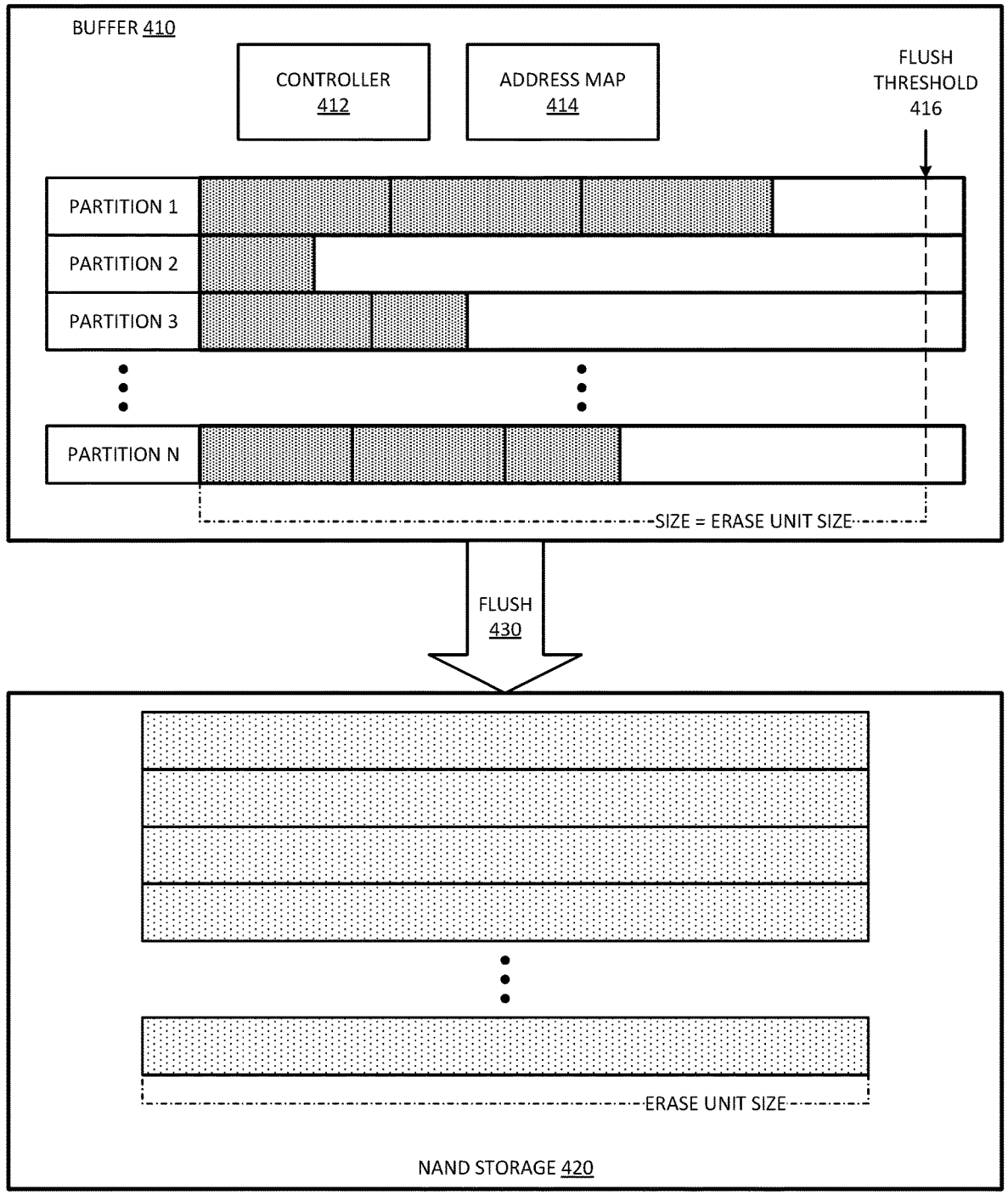
FIG. 4 is a block diagram of an example of a system with partitioned write buffer having partitions of a size equal to an erase unit of the NAND storage.

FIG. 4 is a block diagram of an example of a system with partitioned write buffer having partitions of a size equal to an erase unit of the NAND storage. System 400 represents a buffer and storage system, and is an example of the storage elements of system 100 of FIG. 1, system 200 of FIG. 2, system 300 of FIG. 3, or system 500 of FIG. 5. System 400 includes buffer 410 to buffer write data to NAND storage 420.

NAND storage 420 represents a NAND-based storage device or NAND storage media. NAND storage 420 has an associated erase unit size. NAND storage 420 can be or include a single storage array, or can include multiple storage arrays. For example, NAND storage 420 can include multiple NAND dies in a single storage device.

Buffer 410 represents a partitioned buffer in accordance with any example described. Buffer 410 is shown to include N partitions. Each partition includes at least an erase unit of storage space. In one example, each partition is associated with a different classification of data or different classification of write operation. In one example, the classification of data is based on a type of data, such as user data, system data, or other classification or type. As illustrated, the partitions include flush threshold 416 when at a size or length equal to the size of an erase unit. In one example, the partitions include more storage space than an erase unit size. Such additional storage can allow the partition to continue to store data after the partition has reached flush threshold 416, to be able to receive write data during a period between being marked for flush and actually having contents transferred to NAND storage 420. The ability to store additional data can be useful, for example, in a system that throttles the flushing process.

As illustrated, the shaded blocks can represent write data in the partitions, and the white space within a partition represents free space for the partition. As illustrated, Partition 1 includes the most data and for the snapshot shown is the closest to being flushed, and Partition 2 has the least data and is the farthest from being flushed. It will be understood that different write requests can be associated with different amounts of data. Thus, the shaded blocks can represent data associated with a single write transaction, and different numbers of LBAs can be included in the stored write data. The shaded areas can represent consecutive LBAs; thus, longer segments may have a larger number of consecutive LBAs than shorter segments.

Buffer 410 includes controller 412, which represents buffer logic to control the storing of data in buffer 410 and flushing of data to NAND storage 420. Flush 430 represents a transfer of data from buffer 410 when any partition reaches flush threshold 416. In one example, a host platform via an application provides I/O hints with write data. For example, along with an I/O request, an application can send an I/O hint to the exposed volume. In such an example, controller 412 receives the I/O hints and determines a classification for the write data. In one example, the classification is based on an expected lifetime of data to be written, where the lifetime can indicate an expected amount of time between writes to the data. In one example, I/O requests that access data with similar lifetime or similar velocity can be marked with the same hint value. The hint can be passed or exposed to the volume in accordance with any mechanism to pass data. As non-limiting examples, the hint information can be polled by controller 412 of buffer 410, or the hint can be passed as a header, or as a separate signal (e.g., physical such as through a pin or logical through a message).

In one example, the number N of partitions is a configuration setting, and depends on the type of workload in the computing device in which system 400 is incorporated. Thus, in one example, buffer 410 is dynamically configurable and the number of partitions can be varied based on the system. It will be understood that the configurability is at least partially dependent on the amount of storage available in the physical storage medium of buffer 410. In one example, whenever the caching logic of controller 412 needs to insert new data into buffer 410, it selects the partition based on I/O hint or other classification. Buffering the data based on classification guarantees that all data that has similar classification is placed in the same partition. Thus, each partition contains data with the same classification. In one example, internally each partition is split into buckets, where each bucket (except the last one in each partition) has size equal to size of the optimal erase unit of NAND storage 420.

In one example, controller 412 only flushes one partition at a time, or one bucket at a time. Even one flush can saturate the entire bandwidth of NAND storage 420; thus, in one example, controller 412 manages a throttle for flush 430, such as what is described with respect to system 500. In one example, NAND storage 420 can be segmented or sectorized based on erase unit. NAND storage 420 can be any type of NAND technology, such as SLC (single level cell), MLC (multilevel cell) such as QLC (quad level cell). MLC NAND has larger erase units, but has worse write performance.

As stated previously, N can be any number of partitions. Theoretically, the more partitions the better the performance should be. However, there is a practical limit to N after which there will not be a benefit. The practical limit depends on the workload and the size of the erase unit. Thus, different workload and different erase unit size will affect the number of partitions that should be used in buffer 410.

In one example, the software or firmware of controller 412 includes metadata about the mapping of sectors to NAND media. Address map 414 represents the mapping of the sectors to the NAND media. Buffer 410 is not an image of NAND storage 420, and thus controller 412 can access address map 414 to determine what data is stored at what storage location within buffer 410. Controller 412 can store such information when writing data to the partitions of the buffer. In one example, controller 412 accesses address map 414 to determine whether an incoming I/O request results in a cache hit.

For one example, consider that a partition includes 100 MB of data. If controller 412 receives an I/O request such as: "Write to LBA 5". Assume that a subsequent request "Write to LBA 100" is appended to the same partition. Assume that a subsequent request "Write to LBA 200" is appended to a different partition. Since buffer 410 is not an image of NAND storage 420, controller 412 needs to know what writes and sector numbers are included in buffer 410. When a partition is ready to flush to NAND storage 420, controller 412 can determine what LBAs are stored in the partition and transfer them to the correct location within NAND storage 420. When a subsequent read or write is received, controller 412 can determine whether the LBAs are stored in buffer 410.

In one example, system 400 is implemented in a computing device that performs journal entries, such as data for checkpointing. Checkpointing refers to recording backup data to allow for a restore point in case corruption or error occurs and a user wants to restore from a previous known-good state (such as for power loss tolerance). Such data can be considered to have an extremely short lifetime, and may even be considered to be "write-once, never-read" data, or at least, never read unless there is reason to restore to a prior checkpoint. Such journal data or other data with a very short lifetime can have a significantly negative performance impact on SSDs because of the small, sequential nature of the journal writes. For example, the endurance of QLC media is negatively impacted with small sequential writes.

In one example, one of the partitions of buffer 410 can support data classified as journal data. The use of buffer 410 can significantly improve performance for data classified as having a very short lifetime. For example, the journal write workload will be seen by buffer 410, and hidden from NAND storage 420. Thus, the partition will absorb the journal writes, and NAND storage 420 will not see a write until the associated partition reaches flush threshold 416.

Figure 5:
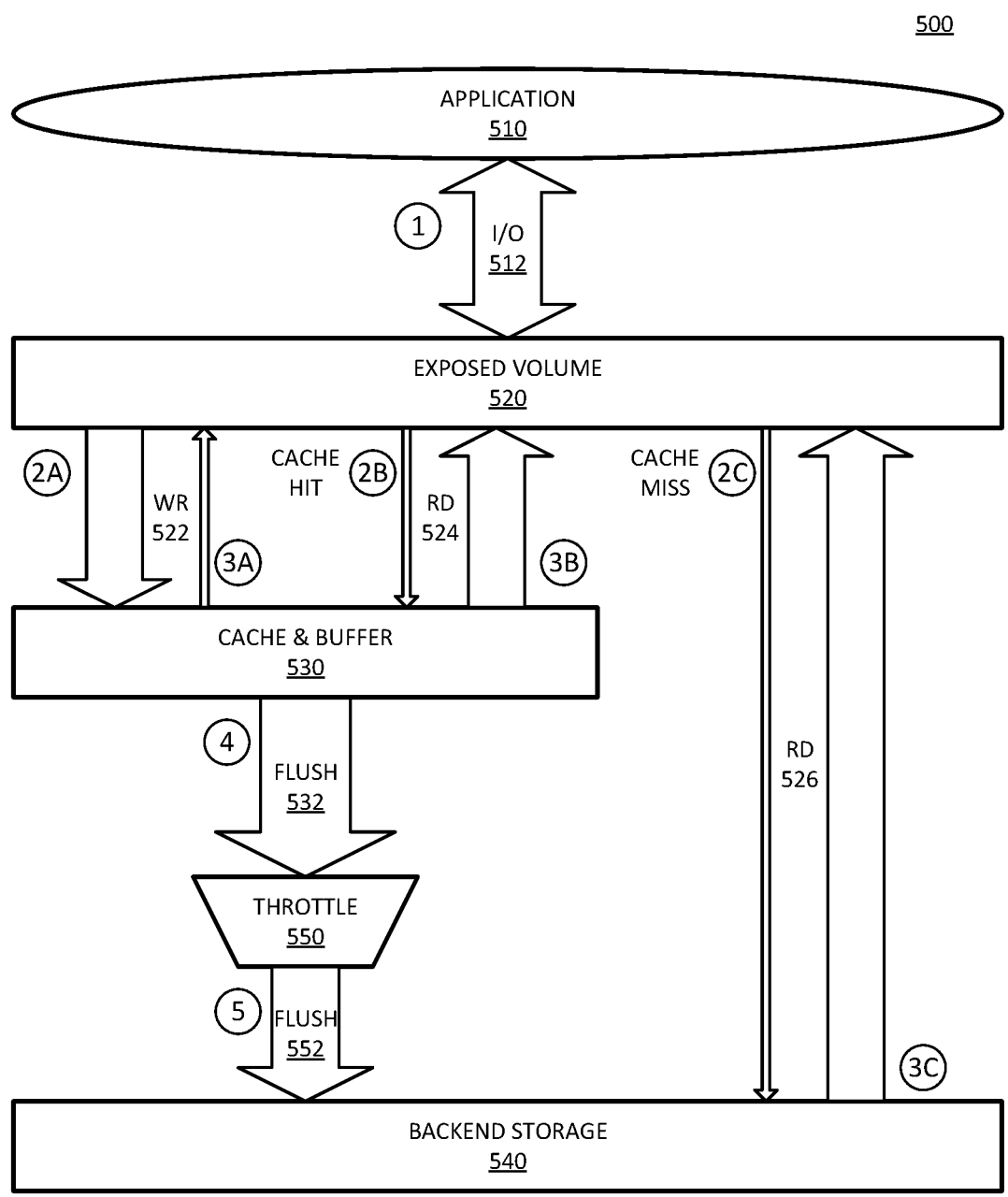
FIG. 5 is a block diagram of an example of an exchange between a host application and a nonvolatile storage device with a partitioned write buffer and a flush throttle.

FIG. 5 is a block diagram of an example of an exchange between a host application and a nonvolatile storage device with a partitioned write buffer and a flush throttle. System 500 represents a logic flow of a storage system with a partitioned write buffer, and can be in accordance with an example of system 100 of FIG. 1, or system 200 of FIG. 2. System 500 provides an example of a system in accordance with system 300 of FIG. 3. System 500 can utilize a cache/buffer device in accordance with buffer 410.

Application 510 represents a software agent executing on a host system that generates a request for data access. Application 510 can be or include a user application or filesystem code that sends I/O (input/output) requests. The I/O requests or the data access request can be a write access request or a read access request, or a combination of a read access request and a write access request. Exposed volume 520 represents a virtual volume to which application 510 sends I/O requests. I/O 512 represents the sending of requests to exposed volume 520. The double-sided arrow represents the fact that read requests can result in data being returned to the application, and write requests can receive an acknowledgement to send back to the application.

Cache & buffer 530 represents a caching device and write buffer for data to be stored in backend storage 540. Cache & buffer 530 can be considered a cache in that data can be read from the cache for a read request that results in a cache hit, prior to flushing the data to backend storage 540. In one example, cache & buffer 530 enables write-in-place for a cache hit for a write request to buffered data that has not been flushed, or a subsequent write request for data that has already been the subject of a write. Cache & buffer 530 is also a buffer for write data to backend storage 540, and the data is buffered prior to being flushed or committed to the backend storage media. In one example, cache & buffer 530 is a 3DXP or 3D crosspoint based media storage.

Backend storage 540 represents a NAND-based storage media. In one example, backend storage 540 is an SSD. In one example, cache & buffer 530 is part of the SSD. NAND storage is block-based for read and write, as opposed to the byte-addressability of cache & buffer 530. Cache & buffer 530 provides a storage media that can accumulate and organize write data for storage in the NAND media of backend storage 540. The controller (not specifically shown) that manages cache & buffer 530 will be aware of the architecture of backend storage 540, such as how much storage, the timing and other access properties of the NAND media, the size of an erase unit, how many arrays or chips or other addressable units there are, or other information. With such information, cache & buffer 530 can make the data "friendly" for write to backend storage 540 by reducing or eliminating writes that do not utilize a full erase unit of backend storage 540.

In system 500, application 310 does not directly access the storage media of backend storage 540. Instead application 510 sends I/O requests 512 to exposed volume 520. Exposed volume 520 can provide a virtual device as an exact view of backend storage 540. Depending on the type of request and the state of cache & buffer 530, the caching and buffering logic (referred to subsequently as buffer logic) of system 500 that manages exposed volume 520, such as the processor in charge of cache & buffer 530, can send the I/O request to either cache & buffer 530 or the NAND media of backend storage 340. As described below, the buffer logic can flush data from the write buffer to the NAND media.

The flow of operation of system 500 can be in accordance with the numbers in system 500. At point 1, application 510 sends I/O request 512 to exposed volume 520. When I/O request 512 is a write request to exposed volume 520, the flow follows at point 2A. Write request 522 illustrates the write request being sent to cache & buffer 530. In one example, buffer logic extracts hint from the I/O request, and determines what partition of cache & buffer 530 to use based on the hint information. With write request 522, the buffer logic can generate an acknowledgement as shown at point 3A by the smaller arrow.

In one example, cache & buffer 530 can store multiple write requests for the same data. Alternatively, the buffer logic enables overwriting the data in cache & buffer 530. In one example, the buffer logic determines whether write request 522 accesses an LBA that is already mapped into cache & buffer 530. In one example, if write request 522 accesses an LBA that is mapped to cache & buffer 530, the buffer logic overwrites the data in-place in cache & buffer 530. Writing data in place in cache & buffer 530 can eliminate data overwrites in backend storage 540 by updating data in-place in cache & buffer 530. Eliminating overwrites in backend storage 540 can eliminate the necessity of invalidating blocks on NAND media, which results in erase units having mixed valid and invalid blocks, as traditionally done. System 500 can accumulate data until an erase unit is ready to flush, which can reduce or eliminate erase units with mixed valid and invalid blocks.

In one example, the buffer logic appends the data to an associated partition or selected bucket. In one example, after appending data to a partition in cache & buffer, the buffer logic can determine if the partition reaches a threshold amount of data, or said another way, whether the bucket becomes full for that class of data. In one example, the threshold or full point refers to reaching a size of an optimal erase unit of backend storage 540. In one example, when the threshold is reached the buffer logic marks the partition as ready for flushing.

Returning to the flow at exposed volume 520, when I/O request 512 is a read request, in one example, the buffer logic determines if the read request refers to an LBA stored in cache & buffer 530. As shown at point 2B, in one example, if I/O request 512 results in read request 524 as a cache hit, the buffer logic forwards the read request to cache & buffer 530, which returns the read data at point 3B. As shown at point 2C, in one example, if I/O request 512 results in request 526 as a cache miss, the buffer logic forwards the read request directly to backend storage 540. At point 3C, backend storage 540 returns the read data to application 510.

In one example, when the I/O results in read request 526 with a cache miss, the buffer logic does not insert the read data into the cache, but instead just reads the data from the backend and returns it to application 510. By not inserting the data into cache & buffer 530, system 500 allows utilization of full read bandwidth of the NAND media, while keeping all the bandwidth of cache & buffer 530 for writes.

Cache & buffer 530 is a partitioned buffer, and data is flushed to backend storage 540 based on individual partitions. In one example, when a partition becomes full or reaches a threshold amount of data, the buffer logic marks the partition for flushing. When the threshold is the size or length of an erase unit of the NAND media of backend storage 540, the write to the NAND media can be made without causing WAF. In one example, the buffer logic limits flush 532 to marked partitions. Thus, for example, the buffer logic can include a process to write data to the partition, which would mark a partition as ready to flush. A separate routine within the buffer logic can then identify full partitions or partitions with at least an erase unit amount of data and perform the flush at point 4. In one example, flush 532 includes the entire partition or an entire erase unit from the partition as one flushing iteration. In one example, assuming two or more partitions or buckets have been marked as ready to flush, the buffer logic may limit flushing to a single partition at a time. Thus, in one example the buffer logic flushes one partition marked for flush and completes the flush of that partition prior to flushing another partition marked as ready for flush. As such, system 500 can limit flushing to one partition at a time.

When cache & buffer 530 is partitioned based on lifetime or velocity classification, system 500 allows data with similar velocity or lifetime to be placed at the same erase unit on NAND storage media of backend storage 540. It will be understood such operation can simulate stream functionality, but can be implemented on drives or storage devices that do not support streams.

In one example, system 500 includes throttle 550 to throttle the bandwidth used by system 500 to flush data from cache & buffer 530. Flush 532 can represent a full flush of the erase unit from a partition, and flush 552 at point 5 represents how the data is actually provided to backend storage 540, with a smaller or limited bandwidth compared to what would be normally performed with a flush from cache & buffer 530. Throttle 550 can reduce the disruption of a write burst. It will be understood that flush 532 could otherwise always result in a write burst that could monopolize the I/O bandwidth of backend storage 540.

With NAND media, the latency of reads is highly dependent on the utilization of NAND dies. To keep utilization of NAND dies at the level that allows meeting desired read QoS requirements, system 500 includes throttle 550 to perform bandwidth throttling while flushing data from cache & buffer 530 to backend storage 540. Flush 552 can transfer data slower than would otherwise be done. In one example, throttle 550 is part of the buffer logic. Either as part of buffer logic, or as a separate component, throttle 550 performs a throttling algorithm. Throttle 550 can use any throttling algorithm, and the exact algorithm used is beyond the scope this description.

One example of a throttling algorithm that could be used is a token bucket (TB) algorithm, but it will be understood that other throttling examples could be used. With a token bucket algorithm, the top edge is where data comes in. The bottom edge is where data is transferred. The buffer logic can issue tokens regularly and can send data or use the token when there is a token available. As time passes, the bucket can fill up with tokens and when tokens fill up, the system drop the tokens because there is enough to guarantee minimum performance. In one example, the top end is not limited, but the system can limit the bottom to guarantee minimum performance.

If the storage medium of cache & buffer 330 is faster than backend storage 540, the I/O to and from cache & buffer 530 can be faster than backend storage 540. Such a condition can produce a risk that flushing of data will not be efficient enough, and cache & buffer 530 can end up running out of space. In such a condition, in one example, system 500 can include another throttle (not specifically shown) at the level of exposed volume 520 to limit the rate at which cache & buffer 530 is filled.

In general, managing the flow of data from cache & buffer 530 to backend storage 540 with throttle 550 can reduce the amount of I/O bandwidth backend storage 540 has to commit to write bursts, which can keep utilization of NAND dies at the level that allows better QoS of reads by preserving bandwidth to service read I/Os. Throttling write bandwidth to the NAND media can flatten drive bursts, and decrease read and write collisions, as well as ensuring system 500 has bandwidth available to be responsive to reads.

In one example, throttle 550 limits the draining or flushing of flush 552 to a level of an average pace of writes or limit to an average rate of receipt of write access requests. For example, the buffer logic can determine a frequency of write data entering cache & buffer 530 from exposed volume 520. If throttle 550 allows flush 552 to transfer data at least equal to the average rate of write data coming into cache & buffer 530, then the throttling will not overrun cache & buffer 530, but can still limit the amount of bandwidth required by backend storage 540 to service write data. In one example, buffer logic can compute an average of amount of write data received over a time window to determine the flush speed. In one example, throttle 550 is dynamically adjustable by the buffer logic. For example, buffer logic can maintain a running average window to determine the write data average, and adjust a setting of throttle 550 in response to the determined average, or average rate of receipt of write data. Thus, throttle 550 can be dynamically programmable. Throttle 550 can limit or throttle flush 552 to an amount of bandwidth lower than the available bandwidth of backend storage 540.

Figure 6:
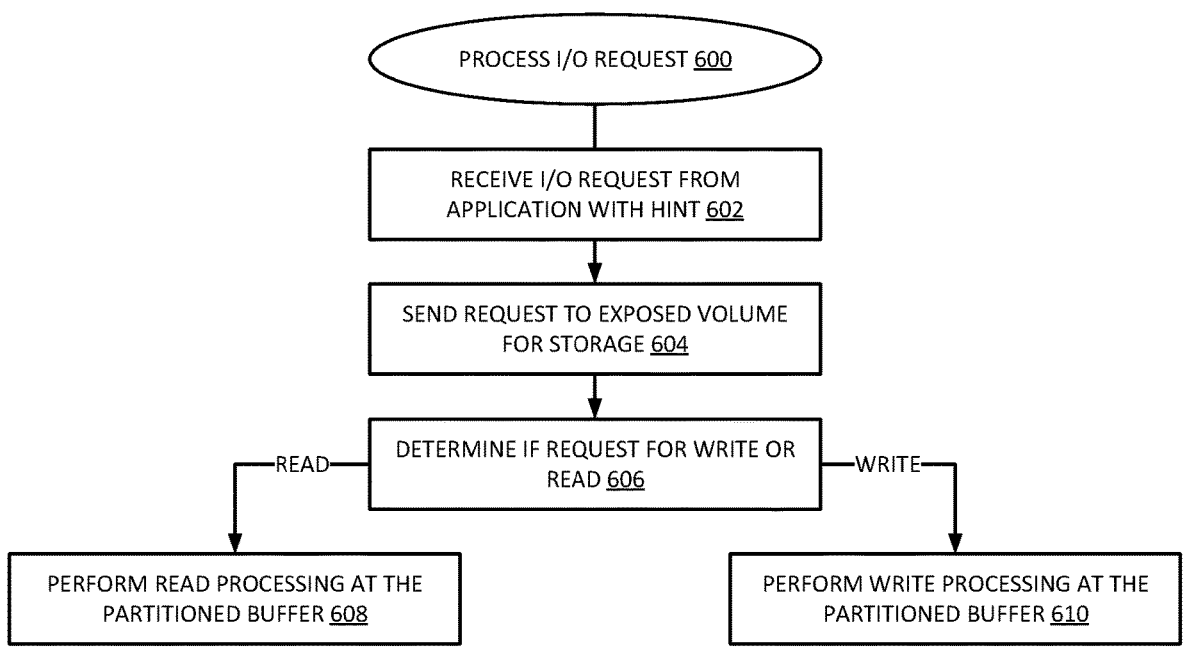
FIG. 6 is a flow diagram of an example of a process for processing an I/O request with a partitioned write buffer.

FIG. 6 is a flow diagram of an example of a process for processing an I/O request with a partitioned write buffer. Process 600 represents a process for receiving and processing an I/O request, which can be performed by a filesystem. In one example, the filesystem is part of a host and provides the data to a classification engine and write buffer, which can be in accordance with any example described. The filesystem is part of the host. In one example, the filesystem includes or calls a classification engine. In another example, the filesystem provides the data to the buffer, which includes a classification engine.

In one example, a filesystem receives an I/O request from an application, 602. The request can include hint information to indicate an expected lifetime of the data, or can include a data type or a use of the data. The hint can be any information to allow the classification engine to classify the data. In one example, the filesystem sends the request to an exposed volume for storage, 604. The exposed volume is an image of the NAND storage, while the write buffer is not.

Buffer logic at the write buffer can determine if a received request is for a write or for a read. If the request is for a read, 606 READ branch, the buffer logic performs read processing at the partitioned buffer, 608. If the request is for a write, 606 WRITE branch, the buffer logic performs write processing at the partitioned buffer, 610.

Figure 7:
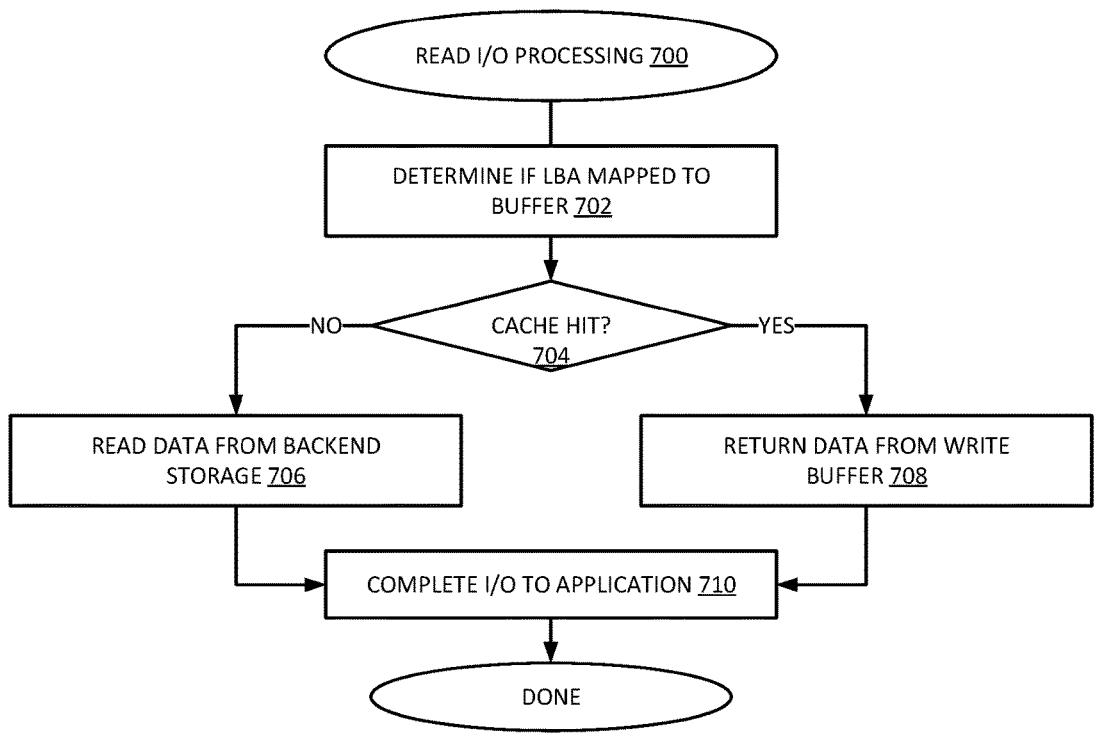
FIG. 7 is a flow diagram of an example of a process for processing a read I/O request with a partitioned write buffer.

FIG. 7 is a flow diagram of an example of a process for processing a read I/O request with a partitioned write buffer. Read I/O processing 700 provides an example of read processing in accordance with element 608 of process 600. Read I/O processing 700 can be performed by the buffer logic of the partitioned write buffer.

In one example, the buffer logic determines if an LBA of the read request is mapped to the write buffer, 702. If the determination does not result in a cache hit, 704 NO branch, the buffer logic can cause the request to be sent to the backend storage device to read the data from the backend storage, 706. If the determination results in a cache hit, 704 YES branch, the buffer logic can access the data from the write buffer and return the data from the write buffer in response to the request, 708.

If the determination results in a cache miss, in one example, the buffer logic does not store the data in the write cache. Such operation can be the default operation for the buffer. Whether reading from the backend NAND storage or from the write buffer, once the data is retrieved, it can be provided to the exposed volume and sent to the requesting application. As such, the system can complete the I/O to the application, 710, and end the process.

Figure 8:
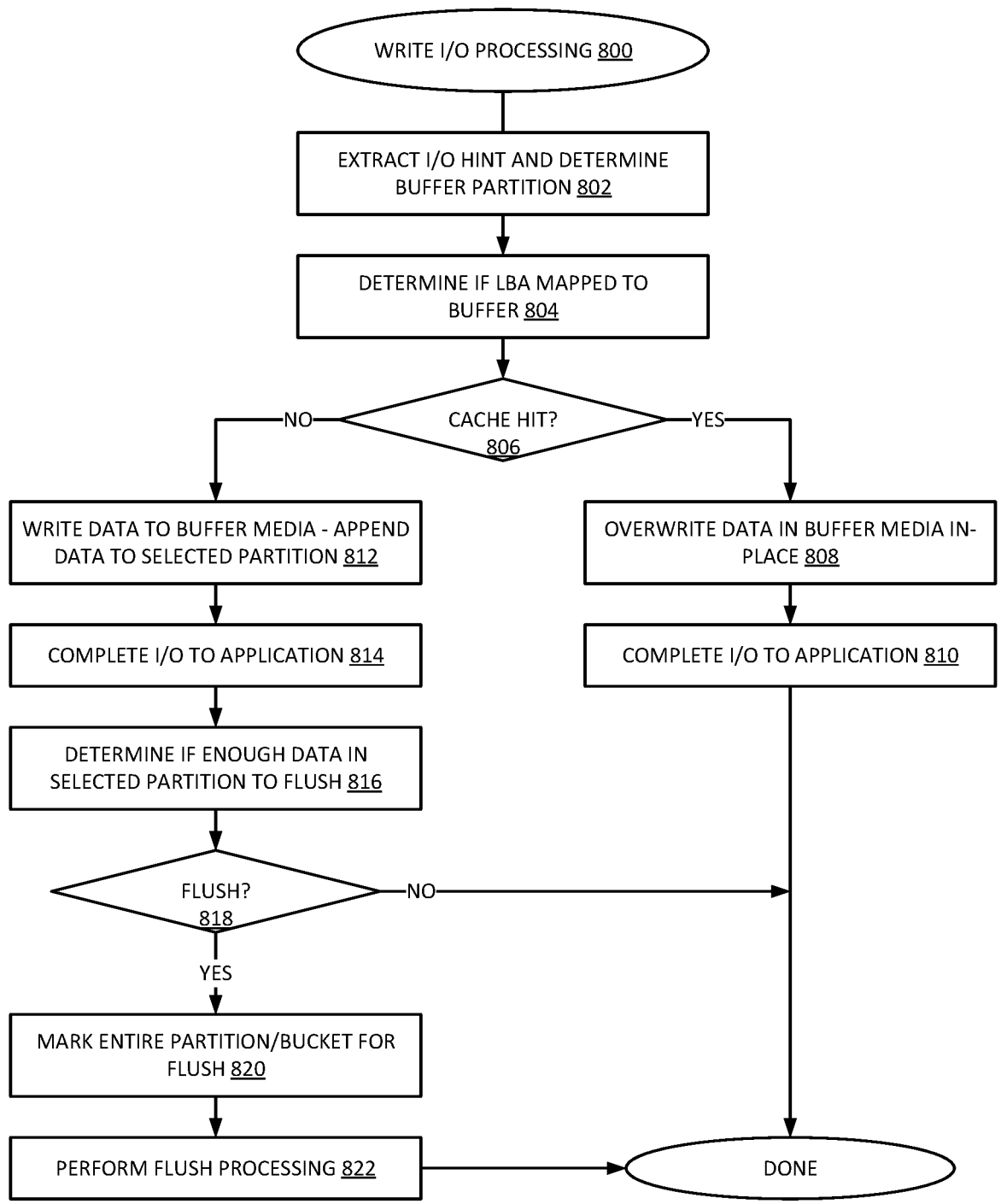
FIG. 8 is a flow diagram of an example of a process for processing a write I/O request with a partitioned write buffer.

FIG. 8 is a flow diagram of an example of a process for processing a write I/O request with a partitioned write buffer.

Write I/O processing 800 provides an example of write processing in accordance with element 610 of process 600. Write I/O processing 800 can be performed by the buffer logic of the partitioned write buffer.

In one example, the application or filesystem provides hint information with the write request. When hint information is used, the buffer logic can extract the I/O hint and determine a buffer partition for the write data, 802. In one example, the determination is performed by a classification engine at the host rather than at the buffer logic. Thus, instead of receiving an I/O hint, the host can provide a write request with a classification indication.

The buffer logic can determine if an LBA of the write request is mapped to the buffer already, 804. If the determination results in a cache hit, 806 YES branch, in one example, the buffer logic overwrites the data in the buffer media in-place, 808. After overwriting the data, the buffer logic can complete the I/O transaction to the application, 810, such as by providing a write acknowledgement. The process can then end.

If the determination results in a cache miss, 806 NO branch, in one example, the buffer logic writes the data to the buffer media, appending the data to a selected partition, 812. The selection of the partition is based on classification of the data, whether by the host or by the buffer logic or by a classification engine somewhere else in the storage stack. In one example, after writing the data to the buffer, the buffer logic can complete the I/O transaction to the application, 814.

Instead of ending the processing, in one example, processing continues after appending new data to the buffer. In one example, the buffer logic determines if enough data is stored in the selected partition to flush the partition, 816. If the partition is not ready to flush, 818 NO branch, in one example, the processing ends. If the partition is ready to flush, 818 YES branch, in one example, the buffer logic marks the partition/bucket for flush, 820. The buffer logic can then perform flush processing, 822. In one example, the flush processing is a separate routine or process from write processing. In one example, the flush processing can be part of the write processing. Flush processing will transfer full a full partition/bucket to the backend NAND storage media.

Figure 9:
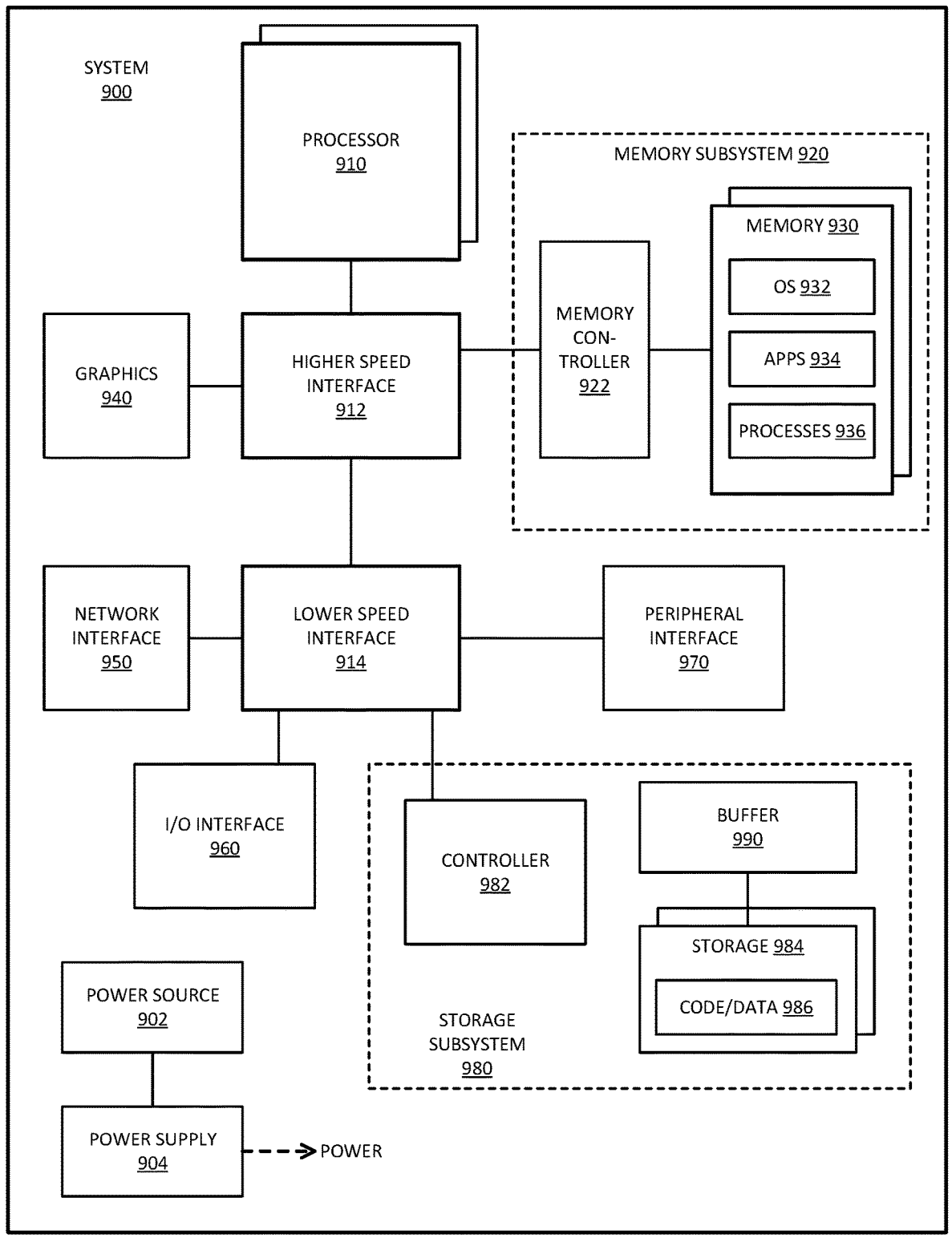
FIG. 9 is a block diagram of an example of a computing system in which a storage system with a partitioned write buffer can be implemented.

FIG. 9 is a block diagram of an example of a computing system in which a storage system with a partitioned write buffer can be implemented. System 900 represents a computing device in accordance with any example herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

In one example, storage subsystem 980 of system 900 includes buffer 990. Storage 984 is or includes NAND storage media. Buffer 990 can be a partitioned buffer in accordance with any example herein. In general, buffer 990 includes separate partitions to cache write data, where the separate partitions store different classes of data. When a partition fills to a threshold amount of data, buffer logic for buffer 990 can flush the contents of the buffer to storage 984 for the full partition. In one example, only full partitions are flushed to storage 984. The threshold amount of data can equal an erase unit of the NAND media of storage 984.

System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, the display can include a touch-screen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Memory subsystem 920 represents the main memory of system 900, and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 900 includes interface 914, which can be coupled to interface 912. Interface 914 can be a lower speed interface than interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can exchange data with a remote device, which can include sending data stored in memory or receiving data to be stored in memory.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one example, storage subsystem 980 includes controller 982 to interface with storage 984. In one example controller 982 is a physical part of interface 914 or processor 910, or can include circuits or logic in both processor 910 and interface 914.

Power source 902 provides power to the components of system 900. More specifically, power source 902 typically interfaces to one or multiple power supplies 904 in system 900 to provide power to the components of system 900. In one example, power supply 904 includes an AC to DC (alternating current to direct current) adapter to plug into a wall outlet. Such AC power can be renewable energy (e.g., solar power) power source 902. In one example, power source 902 includes a DC power source, such as an external AC to DC converter. In one example, power source 902 or power supply 904 includes wireless charging hardware to charge via proximity to a charging field. In one example, power source 902 can include an internal battery or fuel cell source.

Figure 10:
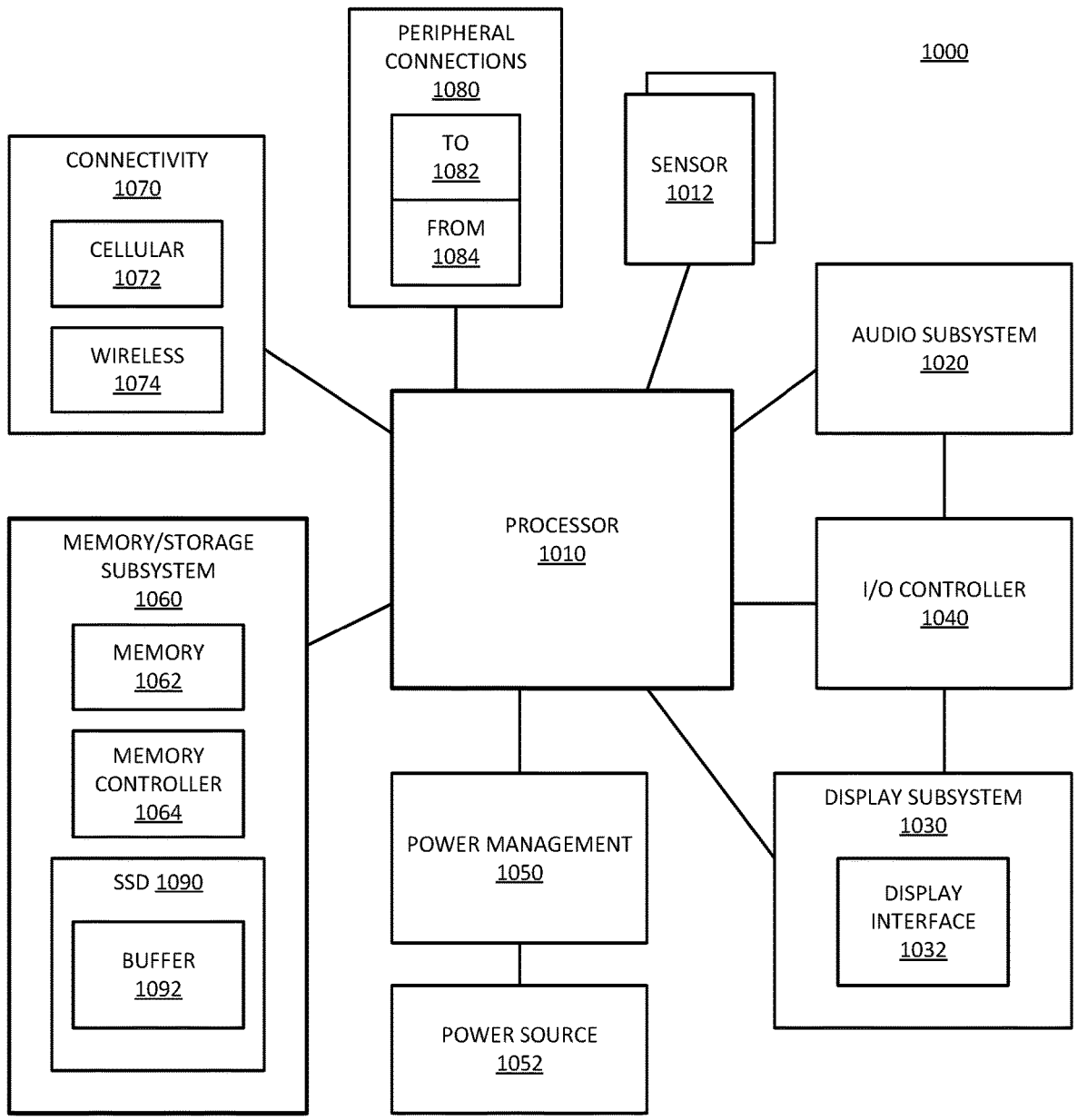
FIG. 10 is a block diagram of an example of a mobile device in which a storage system with a partitioned write buffer can be implemented.

FIG. 10 is a block diagram of an example of a mobile device in which a storage system with a partitioned write buffer can be implemented. Device 1000 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 1000.

In one example, memory/storage subsystem 1060 of device 1000 includes SSD 1090 with buffer 1092. SSD 1090 represents a solid state device, whether standalone or embedded on the platform of device 1000. SSD 1090 includes NAND storage media. Buffer 1092 can be a partitioned buffer in accordance with any example herein. In general, buffer 1092 includes separate partitions to cache write data, where the separate partitions store different classes of data. When a partition fills to a threshold amount of data, buffer logic for buffer 1092 can flush the contents of the buffer to the NAND storage media for the full partition. In one example, only full partitions are flushed to the NAND storage media. The threshold amount of data can equal an erase unit of the NAND storage media.

Device 1000 includes processor 1010, which performs the primary processing operations of device 1000. Processor 1010 can include one or more physical devices, such as microprocessors, application processors, microcontrollers, programmable logic devices, or other processing means. The processing operations performed by processor 1010 include the execution of an operating platform or operating system on which applications and device functions are executed. The processing operations include operations related to I/O (input/output) with a human user or with other devices, operations related to power management, operations related to connecting device 1000 to another device, or a combination. The processing operations can also include operations related to audio I/O, display I/O, or other interfacing, or a combination. Processor 1010 can execute data stored in memory. Processor 1010 can write or edit data stored in memory.

In one example, device 1000 includes one or more sensors 1012. Sensors 1012 represent embedded sensors or interfaces to external sensors, or a combination. Sensors 1012 enable device 1000 to monitor or detect one or more conditions of an environment or a device in which device 1000 is implemented. Sensors 1012 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1012 can also include sensors for biometric systems such as fingerprint recognition systems, face detection or recognition systems, or other systems that detect or recognize user features. Sensors 1012 should be understood broadly, and not limiting on the many different types of sensors that could be implemented with device 1000. In one example, one or more sensors 1012 couples to processor 1010 via a frontend circuit integrated with processor 1010. In one example, one or more sensors 1012 couples to processor 1010 via another component of device 1000.

In one example, device 1000 includes audio subsystem 1020, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1000, or connected to device 1000. In one example, a user interacts with device 1000 by providing audio commands that are received and processed by processor 1010.

Display subsystem 1030 represents hardware (e.g., display devices) and software components (e.g., drivers) that provide a visual display for presentation to a user. In one example, the display includes tactile components or touchscreen elements for a user to interact with the computing device. Display subsystem 1030 includes display interface 1032, which includes the particular screen or hardware device used to provide a display to a user. In one example, display interface 1032 includes logic separate from processor 1010 (such as a graphics processor) to perform at least some processing related to the display. In one example, display subsystem 1030 includes a touchscreen device that provides both output and input to a user. In one example, display subsystem 1030 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, display subsystem includes a touchscreen display. In one example, display subsystem 1030 generates display information based on data stored in memory or based on operations executed by processor 1010 or both.

I/O controller 1040 represents hardware devices and software components related to interaction with a user. I/O controller 1040 can operate to manage hardware that is part of audio subsystem 1020, or display subsystem 1030, or both. Additionally, I/O controller 1040 illustrates a connection point for additional devices that connect to device 1000 through which a user might interact with the system. For example, devices that can be attached to device 1000 might include microphone devices, speaker or stereo systems, video systems or other display device, keyboard or keypad devices, or other I/O devices for use with specific applications such as card readers or other devices.

As mentioned above, I/O controller 1040 can interact with audio subsystem 1020 or display subsystem 1030 or both. For example, input through a microphone or other audio device can provide input or commands for one or more applications or functions of device 1000. Additionally, audio output can be provided instead of or in addition to display output. In another example, if display subsystem includes a touchscreen, the display device also acts as an input device, which can be at least partially managed by I/O controller 1040. There can also be additional buttons or switches on device 1000 to provide I/O functions managed by I/O controller 1040.

In one example, I/O controller 1040 manages devices such as accelerometers, cameras, light sensors or other environmental sensors, gyroscopes, global positioning system (GPS), or other hardware that can be included in device 1000, or sensors 1012. The input can be part of direct user interaction, as well as providing environmental input to the system to influence its operations (such as filtering for noise, adjusting displays for brightness detection, applying a flash for a camera, or other features).

In one example, device 1000 includes power management 1050 that manages battery power usage, charging of the battery, and features related to power saving operation. Power management 1050 manages power from power source 1052, which provides power to the components of device 1000. In one example, power source 1052 includes an AC to DC (alternating current to direct current) adapter to plug into a wall outlet. Such AC power can be renewable energy (e.g., solar power, motion based power). In one example, power source 1052 includes only DC power, which can be provided by a DC power source, such as an external AC to DC converter. In one example, power source 1052 includes wireless charging hardware to charge via proximity to a charging field. In one example, power source 1052 can include an internal battery or fuel cell source.

Memory/storage subsystem 1060 includes memory device(s) 1062 for storing information in device 1000. Memory/storage subsystem 1060 can include nonvolatile (state does not change if power to the memory device is interrupted) or volatile (state is indeterminate if power to the memory device is interrupted) memory devices, or a combination. Memory 1060 can store application data, user data, music, photos, documents, or other data, as well as system data (whether long-term or temporary) related to the execution of the applications and functions of device 1000. In one example, memory/storage subsystem 1060 includes memory controller 1064 (which could also be considered part of the control of device 1000, and could potentially be considered part of processor 1010). Memory controller 1064 includes a scheduler to generate and issue commands to control access to memory device 1062.

Connectivity 1070 includes hardware devices (e.g., wireless or wired connectors and communication hardware, or a combination of wired and wireless hardware) and software components (e.g., drivers, protocol stacks) to enable device 1000 to communicate with external devices. The external device could be separate devices, such as other computing devices, wireless access points or base stations, as well as peripherals such as headsets, printers, or other devices. In one example, device 1000 exchanges data with an external device for storage in memory or for display on a display device. The exchanged data can include data to be stored in memory, or data already stored in memory, to read, write, or edit data.

Connectivity 1070 can include multiple different types of connectivity. To generalize, device 1000 is illustrated with cellular connectivity 1072 and wireless connectivity 1074. Cellular connectivity 1072 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1074 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1080 include hardware interfaces and connectors, as well as software components (e.g., drivers, protocol stacks) to make peripheral connections. It will be understood that device 1000 could both be a peripheral device ("to" 1082) to other computing devices, as well as have peripheral devices ("from" 1084) connected to it. Device 1000 commonly has a "docking" connector to connect to other computing devices for purposes such as managing (e.g., downloading, uploading, changing, synchronizing) content on device 1000. Additionally, a docking connector can allow device 1000 to connect to certain peripherals that allow device 1000 to control content output, for example, to audiovisual or other systems.

In addition to a proprietary docking connector or other proprietary connection hardware, device 1000 can make peripheral connections 1080 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example, an apparatus for storing data includes: an I/O (input/output) interface to couple a host system to a storage device having a NAND storage media; and a partitioned nonvolatile storage media separate from the NAND storage media, the partitioned nonvolatile storage media to be operated as multiple separate partitions, wherein the multiple partitions have a size at least equal to a size of an erase unit of the NAND storage media, the partitioned nonvolatile storage media to receive write access operations for the NAND storage media, and selectively buffer the write access operations in the multiple partitions based on classification of the write access operations, with different classifications for different partitions, wherein the partitioned nonvolatile storage media is to flush a partition to the NAND storage media in response to the partition storing write operations having a size equal to the size of the erase unit.

In one example, the classification is based on an expected lifetime of data to be written, wherein the lifetime is to indicate an expected amount of time between writes to the data. In one example, the partitioned nonvolatile storage media is to receive an indication of a classification of data associated with a received write access operation from a host. In one example, the partitioned nonvolatile storage media is to receive an indication of a type of data for a received write access operation from a host, and determine the classification based on the type of data. In one example, for a received write access operation, the partitioned nonvolatile storage media is to determine if data associated with the received write access operation is stored in the partitioned nonvolatile storage media, and overwrite the data in place in the partitioned nonvolatile storage media prior to flushing the data to the NAND storage media. In one example, the apparatus further includes a controller to control flushing of the partition to the NAND storage media, including to throttle the flushing to a bandwidth lower than available write bandwidth for the NAND storage media. In one example, the controller is to throttle the flushing to a bandwidth based on an average rate of receipt of write access requests. In one example, the apparatus comprises part of a solid state drive (SSD). In one example, the apparatus further includes: a logic block address (LBA) map to indicate LBAs stored in the partitioned nonvolatile storage media and a location in the partitioned nonvolatile storage media of the LBAs. In one example, the partitioned nonvolatile storage media comprises a non-NAND storage media. In one example, the partitioned nonvolatile storage media comprises a single level cell (SLC) NAND media and the NAND storage media comprises a quad level cell (QLC) NAND media.

In general with respect to the descriptions herein, in one example, a system with data storage includes: a host processor to execute an application, the application to generate a write access request for data; a NAND storage media to store the data; and a partitioned write buffer separate from the NAND storage media, the partitioned write buffer to be operated as multiple separate partitions, wherein the multiple partitions have a size at least equal to a size of an erase unit of the NAND storage media, the partitioned write buffer to receive write access operations for the NAND storage media, and selectively buffer the write access operations in the multiple partitions based on classification of the write access operations, with different classifications for different partitions, wherein the partitioned write buffer is to flush a partition to the NAND storage media in response to the partition storing write operations having a size equal to the size of the erase unit.

In one example, the classification is based on an expected lifetime of data to be written, wherein the lifetime is to indicate an expected amount of time between writes to the data. In one example, the partitioned nonvolatile storage media is to receive an indication of a classification of data associated with a received write access operation from a host. In one example, the partitioned nonvolatile storage media is to receive an indication of a type of data for a received write access operation from a host, and determine the classification based on the type of data. In one example, for a received write access operation, the partitioned nonvolatile storage media is to determine if data associated with the received write access operation is stored in the partitioned nonvolatile storage media, and overwrite the data in place in the partitioned nonvolatile storage media prior to flushing the data to the NAND storage media. In one example, the system further includes a controller to control flushing of the partition to the NAND storage media, including to throttle the flushing to a bandwidth lower than available write bandwidth for the NAND storage media. In one example, the controller is to throttle the flushing to a bandwidth based on an average rate of receipt of write access requests. In one example, the system comprises part of a solid state drive (SSD). In one example, the system further includes: a logic block address (LBA) map to indicate LBAs stored in the partitioned nonvolatile storage media and a location in the partitioned nonvolatile storage media of the LBAs. In one example, the partitioned nonvolatile storage media comprises a non-NAND storage media. In one example, the partitioned nonvolatile storage media comprises a single level cell (SLC) NAND media and the NAND storage media comprises a quad level cell (QLC) NAND media. In one example, the system includes one or more of: wherein the host processor comprises a multicore central processing unit (CPU); a display communicatively coupled to the host processor; a battery to power the system; or a network interface communicatively coupled to the host processor.

In general with respect to the descriptions herein, in one example, a method includes: executing an application, the application to generate a write access request for data; sending a request to store the data on a NAND storage media; and intercepting the request with a partitioned write buffer separate from the NAND storage media, the partitioned write buffer to be operated as multiple separate partitions, wherein the multiple partitions have a size at least equal to a size of an erase unit of the NAND storage media, the partitioned write buffer to receive write access operations for the NAND storage media, and selectively buffer the write access operations in the multiple partitions based on classification of the write access operations, with different classifications for different partitions, wherein the partitioned write buffer is to flush a partition to the NAND storage media in response to the partition storing write operations having a size equal to the size of the erase unit.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:
1. A solid state drive (SSD) comprising:
   a first nonvolatile storage including NAND storage media; and
   a second nonvolatile storage separate from the first nonvolatile storage,
   wherein the second nonvolatile storage comprises a nonvolatile write buffer having a first partition and a second partition that is separate from the first partition,
   wherein the first partition buffers write operations of first write data having a first classification based on a first expected frequency of modification of the first write data,
   wherein the second partition buffers write operations of second write data having a second classification based on a second expected frequency of modification of the second write data, wherein the second classification is different from the first classification and the second expected frequency is different from the first expected frequency,
   wherein each of the first partition and the second partition has a size at least equal to a size of an erase unit of the NAND storage media,
   wherein the nonvolatile write buffer is configured to perform a first flush of the first partition to the NAND storage media and to perform a separate second flush of the second partition to the NAND storage media, and
   wherein a selected partition of the first partition and the second partition is flushed to the NAND storage media in response to the selected partition storing write operations having a size reaching a threshold.

2. The SSD of claim 1, wherein the nonvolatile write buffer receives an indication of a classification of data associated with a received write access operation from a host.

3. The SSD of claim 1, wherein the nonvolatile write buffer receives an indication of a type of data for a received write access operation from a host, and determines the classification based on the type of data.

4. The SSD of claim 1, wherein for a received write access operation, the nonvolatile write buffer is configured to determine if data associated with the received write access operation is stored in one of the first partition and the second partition of the nonvolatile write buffer, and additionally configured to overwrite the data in place in the nonvolatile write buffer prior to flushing to the NAND storage media the one of the first partition and the second partition containing the data.

5. The SSD of claim 1, further comprising a controller that is configured to control flushing of the selected partition to the NAND storage media, which control includes throttling the flushing to a bandwidth lower than an available write bandwidth for the NAND storage media.

6. The SSD of claim 5, wherein the controller is configured to throttle the flushing to a bandwidth based on an average rate of receipt of write access requests.

7. The SSD of claim 1, further comprising:
   a logic block address (LBA) map that indicates LBAs stored in the nonvolatile write buffer and a location in the nonvolatile write buffer of the LBAs.

8. The SSD of claim 1, wherein the nonvolatile write buffer comprises a three-dimensional crosspoint (3DXP) storage media.

9. The SSD of claim 1, wherein the nonvolatile write buffer comprises a single level cell (SLC) NAND media and the NAND storage media comprises a quad level cell (QLC) NAND media.

10. The SSD of claim 1, wherein the threshold is equal to the size of the erase unit.

11. A system with data storage, comprising:
a host processor configured to execute an application, wherein the application is configured to generate a write access request for data;
a first nonvolatile storage including NAND storage media; and
a second nonvolatile storage comprising a partitioned write buffer,
wherein the second nonvolatile storage is separate from the first nonvolatile storage,
wherein the partitioned write buffer has a first partition and a second partition that is separate from the first partition,
wherein the first partition buffers write operations of first write data having a first classification based on a first expected frequency of modification of the first write data,
wherein the second partition buffers write operations of second write data having a second classification based on a second expected frequency of modification of the second write data, wherein the second classification is different from the first classification and the second expected frequency is different from the first expected frequency,
wherein the first partition and the second partition have a size at least equal to a size of an erase unit of the NAND storage media,
wherein the partitioned write buffer is configured to perform a first flush of the first partition to the NAND storage media and to perform a separate second flush of the second partition to the NAND storage media, and
wherein a selected partition of the first partition and the second partition is flushed to the NAND storage media in response to the selected partition storing write operations having a size reaching a threshold.

12. The system of claim 11, wherein the partitioned write buffer receives an indication of a classification of data associated with a write access operation from the host processor.

13. The system of claim 11, wherein the partitioned write buffer receives an indication of a type of data for a received write access operation from the host processor, and determines the classification based on the type of data.

14. The system of claim 11, wherein for a received write access operation, the partitioned write buffer is configured to determine if data associated with the received write access operation is stored in one of the first partition and the second partition of the partitioned write buffer, and additionally configured to overwrite the data in place in the partitioned write buffer prior to flushing to the NAND storage media the one of the first partition and the second partition containing the data.

15. The system of claim 11, further comprising a controller that is configured to control flushing of the selected partition to the NAND storage media, which control includes throttling the flushing to a bandwidth lower than an available write bandwidth for the NAND storage media.

16. The system of claim 15, wherein the controller is configured to throttle the flushing to a bandwidth based on an average rate of receipt of write access requests.

17. The system of claim 11, further comprising:
a logical block address (LBA) map that indicates LBAs stored in the partitioned write buffer and a location in the partitioned write buffer of the LBAs.

18. The system of claim 11:
wherein the host processor comprises a multicore central processing unit (CPU);
comprising a display communicatively coupled to the host processor;
comprising a battery to power the system; and/or
comprising a network interface communicatively coupled to the host processor.

19. The system of claim 11, wherein the partitioned write buffer comprises a three-dimensional crosspoint (3DXP) storage media.

20. The system of claim 11, wherein the threshold is equal to the size of the erase unit.

* * * * *